United States Patent
Jacobs et al.

(10) Patent No.: US 9,166,715 B2
(45) Date of Patent: Oct. 20, 2015

(54) METHODS AND APPARATUSES OF USER IDENTIFICATION AND NOTIFICATION OF MULTIMEDIA CONTENT

(75) Inventors: Paul E. Jacobs, La Jolla, CA (US); Jason B. Kenagy, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1366 days.

(21) Appl. No.: 11/862,970

(22) Filed: Sep. 27, 2007

(65) Prior Publication Data
US 2009/0089847 A1    Apr. 2, 2009

(51) Int. Cl.
| | | |
|---|---|---|
| H04N 5/445 | (2011.01) | |
| H04H 60/80 | (2008.01) | |
| H04H 60/37 | (2008.01) | |
| H04N 21/472 | (2011.01) | |
| H04H 60/64 | (2008.01) | |
| H04H 60/65 | (2008.01) | |
| H04H 60/66 | (2008.01) | |
| H04H 60/72 | (2008.01) | |

(52) U.S. Cl.
CPC ............ *H04H 60/80* (2013.01); *H04H 60/372* (2013.01); *H04H 60/64* (2013.01); *H04H 60/65* (2013.01); *H04H 60/66* (2013.01); *H04H 60/72* (2013.01); *H04N 21/472* (2013.01)

(58) Field of Classification Search
CPC .................................................. H04N 21/472
USPC ............................................. 725/32, 40, 58
See application file for complete search history.

(56) References Cited

U.S. PATENT DOCUMENTS

| | | | |
|---|---|---|---|
| 6,701,526 B1 | 3/2004 | Trovato | |
| 2005/0071874 A1* | 3/2005 | Elcock et al. | 725/53 |
| 2006/0206912 A1* | 9/2006 | Klarfeld et al. | 725/40 |
| 2006/0288362 A1* | 12/2006 | Pulton et al. | 725/34 |
| 2007/0204305 A1 | 8/2007 | Jung et al. | |
| 2007/0288970 A1* | 12/2007 | Tedenvall | 725/86 |

(Continued)

FOREIGN PATENT DOCUMENTS

| | | |
|---|---|---|
| CN | 1321389 A | 11/2001 |
| JP | 2004500762 A | 1/2004 |

(Continued)

OTHER PUBLICATIONS

International Search Report, PCT/US2008/077884, International Searching Authority, European Patent Office, Mar. 3, 2009.

(Continued)

*Primary Examiner* — Nasser Goodarzi
*Assistant Examiner* — Michael Hong
(74) *Attorney, Agent, or Firm* — The Marbury Law Group, PLLC

(57) ABSTRACT

Methods, apparatus and systems for sharing information related to broadcast programs are described. One of the methods includes receiving data identifying at least a portion of a first broadcast of a program, receiving data identifying at least one recipient, and communicating information indicative of the identified at least a portion of the program to the at least one recipient. The method may also include identifying a subsequent broadcast of the program to the at least one recipient, and communicating data indicative of the subsequent broadcast of the program to the at least one recipient. Other aspects include systems, apparatus, and devices for sharing information related to broadcast programs.

55 Claims, 5 Drawing Sheets

(56) References Cited

U.S. PATENT DOCUMENTS

| | | | |
|---|---|---|---|
| 2008/0184313 A1* | 7/2008 | Knudson et al. | 725/58 |
| 2009/0049482 A1* | 2/2009 | Auerbach et al. | 725/58 |
| 2009/0083780 A1* | 3/2009 | Beyabani | 725/14 |
| 2010/0064320 A1* | 3/2010 | Angiolillo et al. | 725/46 |

FOREIGN PATENT DOCUMENTS

| | | | |
|---|---|---|---|
| JP | 2007096929 A | | 4/2007 |
| KR | 20040017808 | | 2/2004 |
| KR | 1020040013015 A | | 2/2004 |
| KR | 20060120572 A | | 11/2006 |
| KR | 20070038161 A | | 4/2007 |
| KR | 20070079631 A | | 8/2007 |
| WO | WO02084971 A2 | | 10/2002 |
| WO | WO 03/047257 | * | 5/2003 ............ H04N 7/173 |
| WO | 03047257 | | 6/2003 |
| WO | WO2005015390 A1 | | 2/2005 |
| WO | WO2006036276 | | 4/2006 |

OTHER PUBLICATIONS

Written Opinion, PCT/US2008/077884, International Searching Authority, European Patent Office, Mar. 3, 2009.

International Preliminary Report on Patentability, PCT/US2008/077884, International Bureau, The International Bureau of WIPO, Apr. 8, 2010.

European Search Report—EP08006306, Search Authority—Munich Patent Office, Feb. 25, 2009 (070998).

* cited by examiner

METHODS AND APPARATUSES OF USER IDENTIFICATION AND NOTIFICATION OF MULTIMEDIA CONTENT

FIELD

This application relates generally to electronic communications, and more specifically, to communication of multimedia data.

BACKGROUND

Electronic devices such as mobile telephone handsets and other mobile devices may be configured to receive broadcasts of sports, entertainment, or informational multimedia programs. For example, audio and, or video data may be communicated via a broadband broadcast communications link to the electronic devices. Thus, a need exists for methods and apparatuses for enhancing a user experience and for and viewing broadcast media on such electronic devices.

SUMMARY

Method and apparatuses or devices of the invention each have several aspects, no single one of which is solely responsible for its desirable attributes. Without limiting the scope of this invention, for example, as expressed by the claims which follow, its more prominent features will now be discussed briefly. After considering this discussion, and particularly after reading the section entitled "Detailed Description" one will understand how the features of this invention provide advantages that include allowing an electronic device to rejoin a program during a subsequent broadcast of the program.

An embodiment includes a method of sharing information related to broadcast programs. The method includes identifying at least a portion of a first broadcast of a program, receiving information identifying at least one recipient, and communicating information indicative of the identified at least a portion of the program to the at least one recipient. The method may also include communicating information provided by a user with respect to the program and/or communicating data for at least part of the identified portion.

Another embodiment includes a method of sharing information related to broadcast programs. The method includes receiving data identifying at least a portion of a first broadcast of a program, receiving data identifying at least one recipient, and communicating information indicative of the identified at least a portion of the program to the at least one recipient. The method may also include identifying a subsequent broadcast of the program to the at least one recipient, and communicating data indicative of the subsequent broadcast of the program to the at least one recipient. Other aspects include systems, apparatus, and devices for sharing information related to broadcast programs.

DETAILED DESCRIPTION

The following detailed description is directed to certain specific aspects of the invention. However, the invention can be embodied in a multitude of different ways, for example, as defined and covered by the claims. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Multimedia communications technologies enable users to record video or other programming and send the recorded programming content to one or more recipients. However, recording and transmitting multimedia data often requires a significant amount of resources. Accordingly, embodiments include methods, devices, and systems for enabling users to mark portions of content in an efficient manner and allowing for the sharing of the marked content without having to record or transmit the content to a desired recipient. For example, a user of a device may bookmark or identify a portion of a first broadcast of a program as being of interest. The device then initiates communicating that bookmark or other data indicative of the identified portion of the program to one or more recipients. The recipients may identify a subsequent broadcast of the program for viewing. In another embodiment, the device may communicate the bookmark to a serve that identifies the subsequent broadcast and provides the recipient with reference data, such as scheduling, regarding the subsequent broadcast. The server may track and maintain aggregate information about such bookmarks so as to identify popular programs or portions of programs. The server may also provide other social networking related functions to the user and/or the recipient such as storing and sharing user or recipient comments or process and store other data related to the sharing of information about broadcast programs.

Figure 1:
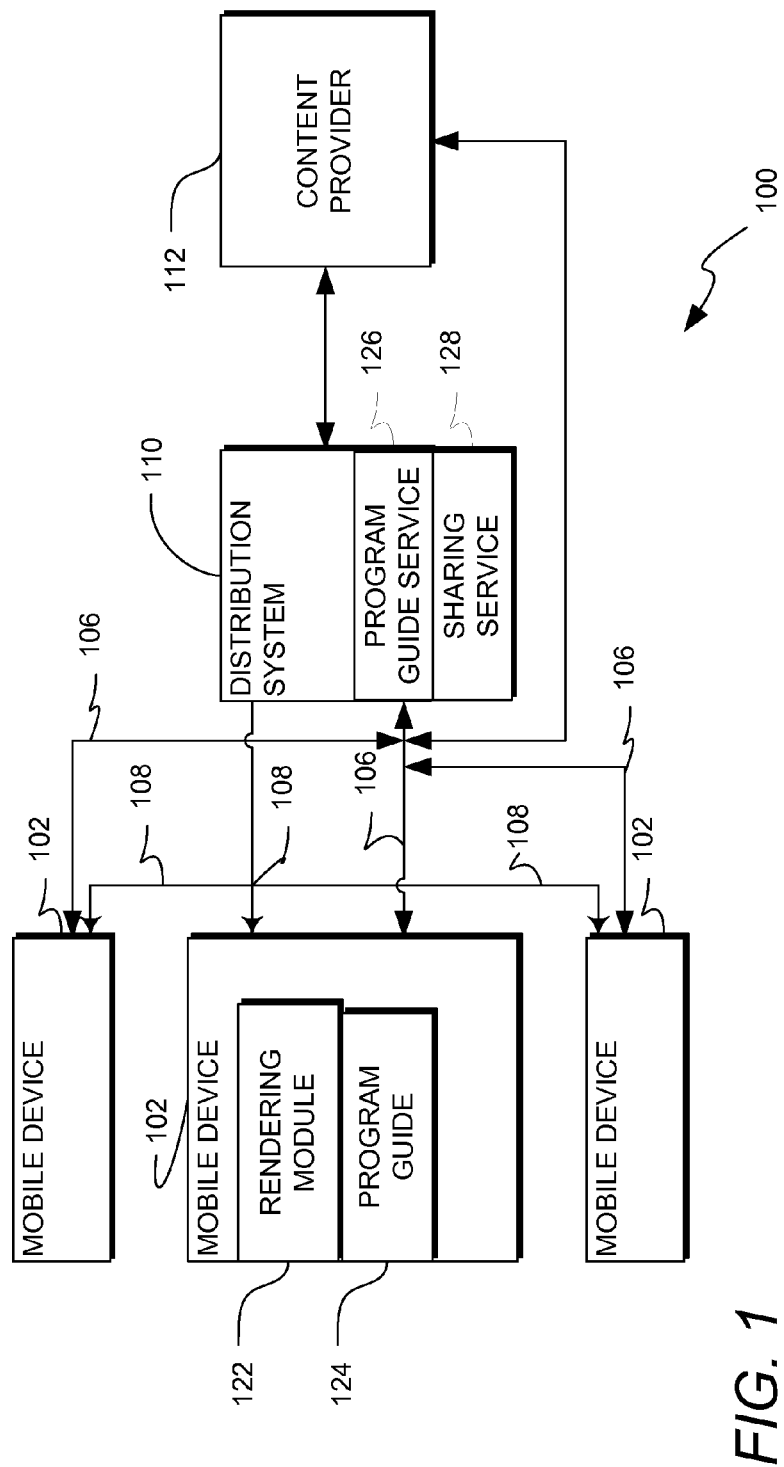
FIG. 1 is a block diagram illustrating an example system for providing broadcast programming to mobile devices.

FIG. 1 is a block diagram illustrating an example system 100 for providing broadcast programming to mobile devices 102 from one or more content providers 112 via a distribution system 110. Although three mobile devices 102 are shown in FIG. 1, examples of the system 100 may be configured to use any number of mobile devices 102. The distribution system 110 may receive data representing a multimedia program from the content provider 112. The multimedia programs may be communicated over a wired or wireless program communication link 108. In one embodiment, the communications link 108 is a high speed or broadband link. In one embodiment, the content provider 112 may communicate the content directly to the mobile device 102 (not shown in FIG. 1), bypassing the distribution system 110, via the communications link 108 or via another link. It is to be recognized that in other embodiments multiple content providers 112 may provide programs via multiple distribution systems 110 to the mobile devices 102 either by way of the distribution system 110 or directly.

In the example system 100, the program communication link 108 is illustrated as a uni-directional network to each of the illustrated devices 102. However, the program communication link 108 may also be a fully symmetric bi-directional network. The program communication link 108 may comprise one or more wired and/or wireless links, including one or more of a Ethernet, telephone (e.g., POTS), cable, power-line, and fiber optic systems, and/or a wireless system comprising one or more of a code division multiple access (CDMA or CDMA2000) communication system, a frequency division multiple access (FDMA) system, a time division multiple access (TDMA) system such as GSM/GPRS (General Packet Radio Service)/EDGE (enhanced data GSM environment), a TETRA (Terrestrial Trunked Radio) mobile telephone system, a wideband code division multiple access (WCDMA) system, a high data rate (1xEV-DO or 1xEV-DO Gold Multicast) system, an IEEE 802.11 system, a MediaFLO system, a DMB system, an orthogonal frequency division multiple access (OFDM) system, or a DVB-H system.

In the example system 100, the mobile devices 102 are also configured to communicate over a second communication link 106. In one embodiment, the second communication link 106 is a two way communication link. In the example system 100, however, the link 106 may also comprise a second link from the mobile device 102 to the distribution system 110 and/or the content provider 112. The second communication link 106 may also be a wireless network configured to communicate voice traffic and/or data traffic. The mobile devices 102 may communicate with each other over the second communication link 106. The communication link 106 may also communicate program guide and other data between the distribution system 110 and the mobile devices 102.

The mobile devices 102 include a rendering module 122 configured to render the multimedia programming received over the program communication link 108. The rendering module 122 may include analog and/or digital technologies. The rendering module 122 may include one or more multimedia signal processing systems, such as video encoders/decoders, using encoding/decoding methods based on international standards such as MPEG-x and H.26x standards. Such encoding/decoding methods generally are directed towards compressing the multimedia data for transmission and/or storage.

In addition to communicating programming content to the mobile device 102, the distribution system 110 may also include a program guide service 126. The program guide service 126 receives program schedule and content related data from the content provider 112 and/or other sources and communicates data defining an electronic programming guide (EPG) 124 to the mobile device 102. The EPG 124 may include data related to the broadcast schedule of multiple programs available to be received over the program communication link 108. The EPG data may include titles of programs, start and end times, category classification of programs (e.g., sports, movies, comedy, etc.), quality ratings, adult content ratings, etc. The EPG 124 may also be communicated to the mobile device 102 over the program communication link 108 and stored on the mobile device 102. The distribution system 110 may further comprise a sharing system 128. The sharing service 128 may comprise a server computer system, e.g., one or more processors, storage, suitable network connections, and software instructions for allowing users to share and exchange information related to broadcast programs. It is to be recognized the various functional components of the distribution system 110, the program guide service 126, and the sharing system 128 may be performed by the same server computer or server computer cluster or by partially shared server computers, or by entirely separate server computers.

Figure 2:
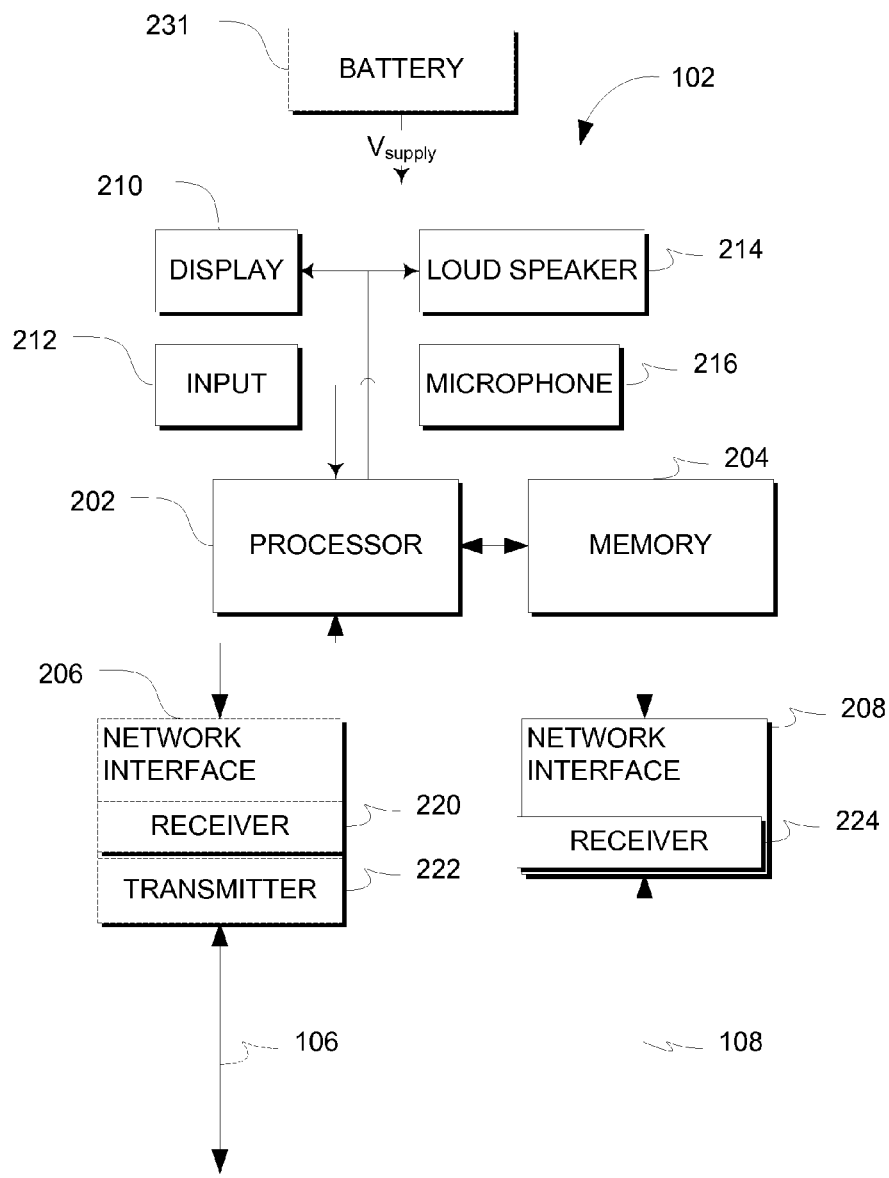
FIG. 2 is a block diagram illustrating an example of a mobile device such as illustrated in FIG. 1.

FIG. 2 is a block diagram illustrating an example of one of the mobile devices 102 such as illustrated in FIG. 1. The device 102 includes a processor 202 that is in communication with a memory 204 and a network interface 208 that communicates over the program communication link 108. The network interface 208 includes a receiver 224 configured to receive the unidirectional program communication link 108. The network interface 208 and receiver 224 may receive signals according to wired technologies including Ethernet, telephone (e.g., POTS), cable, power-line, and fiber optic systems, and/or wireless technologies comprising one or more of a code division multiple access (CDMA or CDMA2000) communication system, a frequency division multiple access (FDMA) system, a time division multiple access (TDMA) system such as GSM/GPRS (General Packet Radio Service)/EDGE (enhanced data GSM environment), a TETRA (Terrestrial Trunked Radio) mobile telephone system, a wideband code division multiple access (WCDMA) system, a high data rate (1xEV-DO or 1xEV-DO Gold Multicast) system, an IEEE 802.11 system, a MediaFLO system, a DMB system, an orthogonal frequency division multiple access (OFDM) system, or a DVB-H system.

The mobile device 102 may include an optional second network interface 206 for communicating via the second bi-directional communication link 106. The network interface 206 may include any suitable antenna (not shown), a receiver 220, and a transmitter 222 so that the exemplary device 102 can communicate with one or more devices over the second communication link 106. Optionally, the network interface 206 may also have processing capabilities which reduce processing requirements of the processor 202.

The device 102 may also include one or more of a display 210, a user input device 212 such as a key, touch screen, or other suitable tactile input device, a loudspeaker 214 comprising a transducer adapted to provide audible output based on a signal received over the communication link 106 and/or a microphone 216 comprising a transducer adapted to provide audible input of a signal that may be transmitted over one or both of the communication links 106 and 108.

The device 102 may optionally include a battery 231 to provide power to one or more components of the device 102. The device 102 may comprise at least one of a mobile handset, a personal digital assistant, a laptop computer, a headset, a vehicle hands free device, or any other electronic device. For example, one or more aspects taught herein may be incorporated into a phone (e.g., a cellular phone), a personal data assistant ("PDA"), an entertainment device (e.g., a music or video device), a headset (e.g., headphones, an earpiece, etc.), a microphone, or any other suitable device.

The device 102 may be implemented in a variety of ways. Referring to FIG. 2, the device or apparatus 102 is represented as a series of interrelated functional blocks that may represent functions implemented by, for example the processor 202, software, some combination thereof, or in some other manner as taught herein. For example, the processor 202 may facilitate user input via the input devices 212. Further, the transmitter 222 may comprise a processor for transmitting that provides various functionalities relating to transmitting information to another device 102. The receiver 220 may further comprise a processor that provides various functionality relating to receiving information from another device 102.

The device 102 may be configured to receive data concurrently from one or both of the communication links 106 and 108. For example, the processor 202 may be incapable of performing the receiving and/or transmitting functions of the bidirectional network interface 206 at the same time that the broadband unidirectional interface 208 is receiving over the program communication link 108. Thus, for example, in one embodiment, reception or display of a broadcast of a program may be discontinued over the program communication link 108 when a signal, e.g., a telephone call for example, is received over the communication link 106.

The device 102 may be implemented using any suitable combination of the functions and components discussed with reference to FIG. 2. In one example of the device 102, the device 102 may comprise one or more integrated circuits. Thus, such integrated circuits may comprise one or more processors that provide the functionality of the processor 202 illustrated in FIG. 2. The integrated circuit may comprise other types of components that implement some or all of the functionality of the illustrated processor components. Further, one or more processors may implement the functionality of the illustrated processor components.

Figure 3:
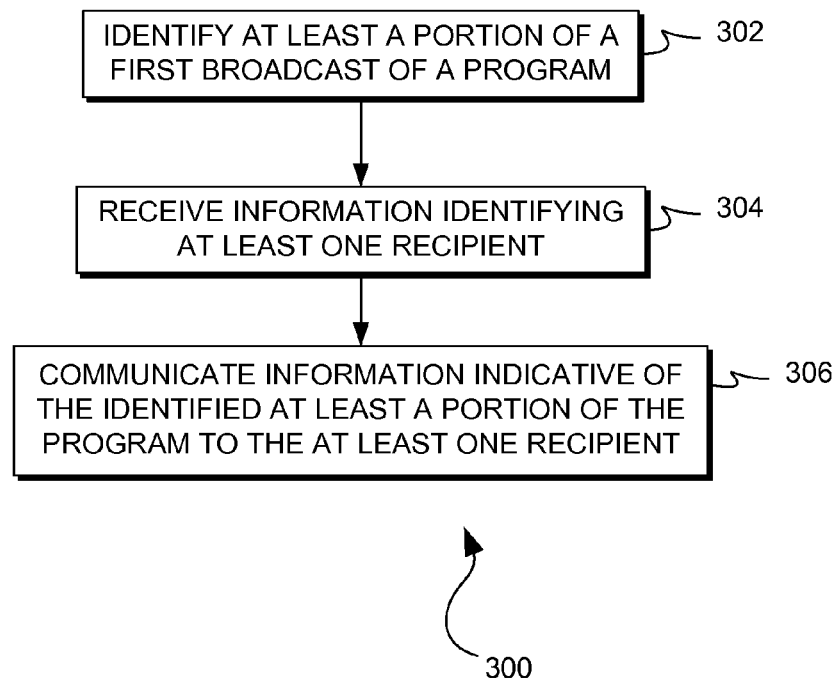
FIG. 3 is a flowchart illustrating an example of a method of sharing information related to broadcast programs such as in the example system illustrated in FIG. 1.

FIG. 3 is a flowchart illustrating an example of a method 300 of sharing information related to broadcast programs such as in the example system 100. The method 300 begins at a block 302 in which the processor 202 identifies at least a portion of a broadcast of a program. For example, the processor 202 may identify the portion based on input from a user via the input device 212. The processor 202 may identify the portion, for example, while, or as part of, receiving the broadcast program over the program communication link 108 using the network interface 208 and/or the receiver 224. Alternatively, the processor 202 may identify the portion of the program while rendering a previously recorded program or a program file that was sent to the device over the bidirectional link. The portion being identified may be the portion that begins at a specified elapsed time from the start of the program. The portion may include a range of such elapsed times. The portion being identified may be a scene sequence number, a frame number, or some other data identifying a temporal location in the program sequence. The identifying information may also include a program identifier such as a title, serial number, or other data used to identify the program that was being received. The identified portion may also refer to a data item which includes substantially the entire program.

The input received from the user may comprise at least one key press or other user selection from the input device 212. The input received by the user may also be in the form of a voice command. The input received from the user may be received while the processor 202 is rendering and displaying the program. The input received from the user may also be received prior to or subsequent the rendering of the program. For example, the user may recognize the name of the program in an EPG, and input a command to identify at least a portion of the program prior to the program being broadcast. Alternatively, the user may have completed watching the program and input a command to identify at least a portion of the program that they have completed watching.

In other examples, the processor 202 may automatically identify the at least a portion of the program at block 302. For example, the memory 204 may store rules or instructions identifying types of programs to be identified automatically. The rules may pertain to program themes (e.g., entertainment, sports, movies, news items, financial news, company specific news, personalities, special events, politics, etc.), special interests, and other categories. The processor may automatically identify the at least a portion of the program at block 302 during rendering of the program as well as before or after the program is broadcast (e.g., by searching an EPG).

Proceeding to a block 304, the processor receives information identifying at least one recipient. The information may comprise one or more of phone numbers, identification numbers, email addresses, employee numbers, and names, any of which may correspond to individuals and/or groups of individuals (e.g., an email group that is associated with forwarded to a set of individual email addresses). The information may be received by the processor 202 from the memory 204, from a user input, over a network connection or any other suitable means. The processor 202 may receive information in one form such as, for example, a name, and may search for the name in a table of associated information stored in memory (or stored in another remote device), and may identify another form of identifying information such as, for example, an email address.

The information received by the processor 202 at the block 304 may also include information provided by a user associated with the program, such as, for example, the user that triggered the identification of the at least a portion of the program at the block 302. The information provided by the user may include a personal message to the recipient indicating why the recipient should be interested in the portion of the program that is identified.

Next at a block 306, the processor 202 may communicate information indicative of the identified at least a portion of the program to the at least one recipient. The device 102 may communicate the information directly to the recipient on another mobile device 102 or to the recipient via the sharing service 128. The information that is communicated may include a specified elapsed time from the start of the program, a scene sequence number, a frame number, or any other suitable data identifying a temporal location in the program sequence where the program was terminated. The information may also include a program identifier such as a title, serial number, or other form of data used to identify the program that was being received. The information communicated, may also include the information provided by the user associated with the program as discussed above.

The information communicated may also include data representing at least part of the portion of the program. For example, a small snippet of multimedia data may last about 5, 10, 15, 20, 25, 30, 35, 40, 45, 50, 55, 60 seconds or longer. By providing this small part or preview of the program the recipient can be informed as to why they may wish to watch a subsequent broadcast of the program. The multimedia data may also include one or more screenshots, images, audio samples, or other parts of the program. The communicated data may be compressed to improve efficiency. In one embodiment, data representing the identified portion, or all of the program, may be stored by the sharing system 128 and/or the distribution system 110. The data may represent substantially the entire program. In one embodiment, the sharing system 128 may communicate the data representing all or part of the program via a broadcast, multicast, or unicast stream to a device 102 of the recipient, the device 102 of the user communicating the identification information, or the device 102 of any other user. The sharing system 128 may communicate the data in response to a request from the particular device 102.

The functions performed at block 306 may be performed by the processor 202 and/or one or both of the network interfaces 206 and 208 (in the case of a bidirectional communication link 108) of the mobile device 102. The communication may be over one or more communication links including wireless and/or wire line portions. In one embodiment, the part of the program may be identified and communicated to a server such as the sharing service 128, which collects the part of the portion of the program, e.g., the screenshot, image, or audio sample that may be included in the information provided to the recipient.

The processor 202 may also provide other information to be communicated to the recipient at the block 306. For example, the processor 202 may identify a subsequent broadcast of the program based on data contained in an EPG, for example. Identifying the subsequent broadcast of the program may include outputting an identifier for the subsequent broadcast of the program (e.g., a schedule serial number, a channel number, a title, a time, a date, etc.). The information indicative of the subsequent broadcast may then be output as a notification. The notification may also be included in the information communicated to the recipient. The notification may be in the form of instructions that can be performed by a processor associated with the recipient device 102 that receives the information communicated. For example, the notification instructions may cause the recipient device to generate a sound on a loudspeaker and/or display a message on a display. In one aspect, the notification may be communicated in the same message containing the information indicative of the program. In other examples of the system 100, the notification may be communicated at a later time, such as upon identifying the subsequent broadcast, or at a specified time interval prior to the subsequent broadcast. The notification may be configured, for example, to be output by the recipient device at a specified time interval prior to the subsequent broadcast of the program.

The information may be provided to the recipient so that the recipient (e.g., a device or user of a device) may view or schedule viewing of the at least a portion of the program. If a notification about a subsequent broadcast was included in the information, the recipient is also informed about the subsequent broadcast of the program. The notification may include a notification at time of receipt and/or a notification at the time of the subsequent broadcast. Upon being notified of the subsequent broadcast, the recipient may choose to receive, render and display the subsequent broadcast. The notification may output a query to the recipient to which the recipient may respond with a "yes" or "no" indication. The notification may be output well in advance of the broadcast (e.g., a month prior, a week prior, one or more days prior, or one or more hours prior to the subsequent broadcast). In this way, the recipient is able to indicate a "yes" or "no" command to their respective mobile device and, in response, the mobile device automatically begins receiving, rendering and displaying the subsequent broadcast at such later time. Alternatively, the notification may be output a short time prior to the subsequent broadcast (e.g., less than about 1 hour). This would allow the recipient to decide whether to watch the subsequent broadcast while having more information as to their current personal schedule. The notification may be configured to repeatedly notify the recipient about future subsequent broadcasts until the recipient turns off or terminates the notification. The recipient device may receive, render and display the subsequent program at various times such as at about the start of the program or at about the start of the identified portion of the program that was identified at the block 302.

Figure 4:
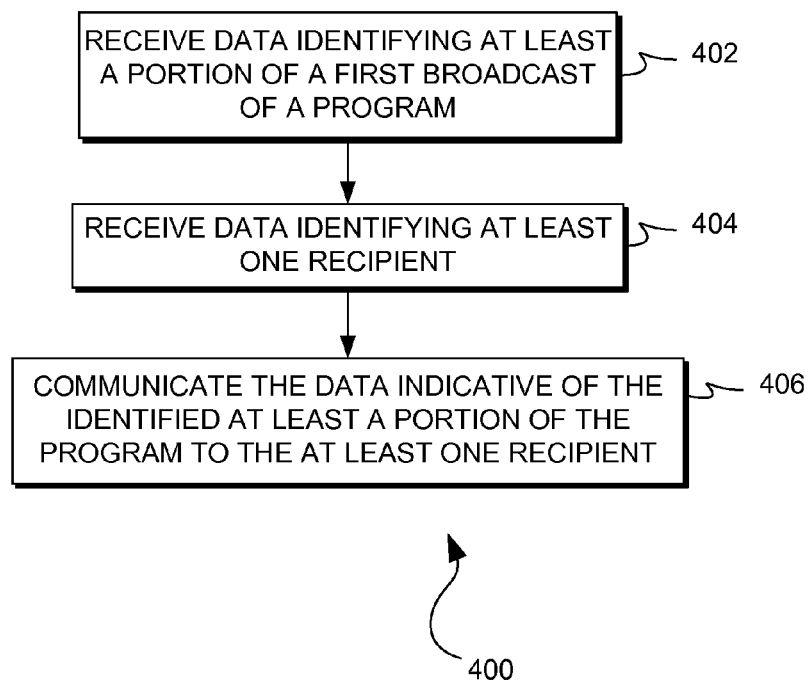
FIG. 4 is a flowchart illustrating another example of a method of sharing information related to broadcast programs such as in the example system illustrated in FIG. 1.

FIG. 4 is a flowchart illustrating another example of a method 400 of sharing information related to broadcast programs such as in the example system 100. The acts or events associated with the method 400 may be performed by multiple types of service devices in the system 100. For example, the method 400 may be performed by the sharing service 128. Advantageously, the method 400 allows a majority of the processing to be done by the servers of the infrastructure which typically have more processing capability and power than the mobile devices 102. As discussed above, in response to one or more trigger events, data identifying at least a portion of the program that was being watched is generated by the mobile device 102 and received at block 402 by, for example, the sharing service 128. As discussed above with reference to FIG. 3, the portion being identified may be the portion at a specified elapsed time from the start of the program. The portion being identified may be a scene sequence number, a frame number, or some other piece of data identifying a temporal location in the program sequence where the program was terminated. The received identifying information may also include a program identifier such as a title, serial number, or other data used to identify the program that was being received.

The sharing service 128 may receive a message from the mobile device 102, the message containing the data identifying the portion. In these examples, the message may be received before, during, or after the mobile device 102 receives the first broadcast of the program. In other examples, the sharing service 128 may receive a message indicating that the user of the mobile device 102 wants to identify a portion of the program currently being watched. In these examples, the message may contain a temporal indication of the start of the portion as well as a duration or a temporal indication of the end of the portion of the program that the user is watching. The server process can then identify the program that the mobile device 102 is receiving (e.g., using data indicative of an EPG).

Proceeding to block 404, the sharing service 128 receives information identifying at least one recipient from the device 102. The information may comprise one or more of phone numbers, identification numbers, email addresses, employee numbers, and names, any of which may correspond to individuals and/or groups of individuals (e.g., an email group that gets forwarded to a set of individual email addresses). The information may be received by the sharing service 128 over the bidirectional communication link 106 in a message from the mobile device 102. The sharing service 128 may receive information in one form such as, for example, a name, and may search for the name in a table of associated information stored in memory (or stored in another remote device), and may identify another form of identifying information such as, for example, an email address.

The information received by the sharing service 128 at the block 304 may also include information provided by a user associated with the mobile device receiving the program. The information provided by the user may include a personal message to the recipient indicating why the recipient should be interested in the portion of the program that is identified. In one embodiment, the sharing service 128 may store the identified portion of the program. In one embodiment, the stored portion may be communicated to the device 102 of the recipient, to the device 102 of the user who identifies the portion of the program, or the device 102 of any other user. The sharing service 128 may communicate the stored portion over either of the communication links 106 or 108, or any other suitable communications link. The sharing service 128 may stream the stored portion to a particular device 102 via a broadcast, multicast, or a unicast stream at a specified time or in response to a request from a user of a particular device.

Next at a block 406, the sharing service 128 communicates information indicative of the identified at least a portion of the program to the at least one recipient. The information that is communicated may include a specified elapsed time from the start of the program, a scene sequence number, a frame number, or some other data identifying a temporal location in the program sequence where the portion of the program ends. The information may also include a program identifier such as a title, serial number, or other form of data used to identify the program that was being received. The information communicated at the block 406, may also include information provided by the sending user, as discussed above.

The information communicated at the block 406 may also include data representing at least part of the portion of the program. For example, a small snippet of multimedia data may be about 5, 10, 15, 20, 25, 30, 35, 40, 45, 50, 55, 60 seconds long or longer. By providing this small part, or preview, of the program the recipient will be informed as to why they should watch a subsequent broadcast of the program. The multimedia data may also be snapshots, or images such as a slide show of the program instead of a streaming video sequence. This may be useful if the program is an art show or some other event where images would be as effective or even more effective that motion pictures (e.g., dogs at a dog show, a beauty contest, a fashion show, etc.). The data may be compressed to improve efficiency. In one embodiment, data representing the identified portion, or all, of the program may be stored by the sharing system 128 and/or the distribution system 110. The data may represent substantially the entire program. In one embodiment, the sharing system 128 may communicate the data representing all or part of the program via a broadcast, multicast, or unicast stream to a device 102 of the recipient, the device 102 of the user communicating the identification information, or the device 102 of any other user. The sharing system 128 may communicate the data in response to a request from the receiving device 102.

The method 400 may include providing other information to the recipient as discussed above with reference to the block 306. For example, the sharing service 128 may identify a subsequent broadcast of the program based on schedule data which may also be contained in an EPG of the user device. Identifying the subsequent broadcast of the program may include outputting an identifier for the subsequent broadcast of the program (e.g., a schedule serial number, a channel number, a title, a time, a date, etc.). The information indicative of the subsequent broadcast may then be output as a notification. The notification may also be included in the information communicated to the recipient. The notification may be in the form of instructions that can be performed by a processor associated with the recipient device, which receives the information communicated. For example, the notification instructions may cause the recipient device to generate a sound on a loudspeaker and/or display a message on a display. In one aspect, the notification may be communicated in the same message containing the information indicative of the program. In other aspects, the notification may be communicated at a later time, such as upon identifying the subsequent broadcast, or at a specified time interval prior to the subsequent broadcast. The notification may be configured, for example, to be output by the recipient device at a specified time interval prior to the subsequent broadcast of the program.

The information may be provided to the recipient so that the recipient (e.g., a device or user of a device) may view or schedule viewing of the at least a portion of the program. If a notification was included in the information, the recipient is also informed about the subsequent broadcast of the program. Upon being notified of the subsequent broadcast, the recipient may then choose to receive, render and display the subsequent broadcast. The notification may output a query to the recipient to which the recipient may respond with a yes or no command. The notification may be output well in advance of the broadcast (e.g., a month prior, a week prior, one or more days prior, or one or more hours prior to the subsequent broadcast). In this way, the recipient is able to input a "yes" or "no" command to their respective mobile device. The mobile device responds to a "yes" command by automatically receiving, rendering and displaying the subsequent broadcast. Alternatively, the notification may be output a shorter time prior to the subsequent broadcast (e.g., less than about 1 hour). This would allow the recipient to decide to watch the subsequent broadcast having more idea of their current personal schedule. The notification may be configured to repeatedly notify the recipient about future subsequent broadcasts until the recipient responds to the notification. The recipient device may receive, render and display the subsequent program at various times such as at about the start of the program or at about the start of the identified portion of the program that was identified at the block 402.

Figure 5:
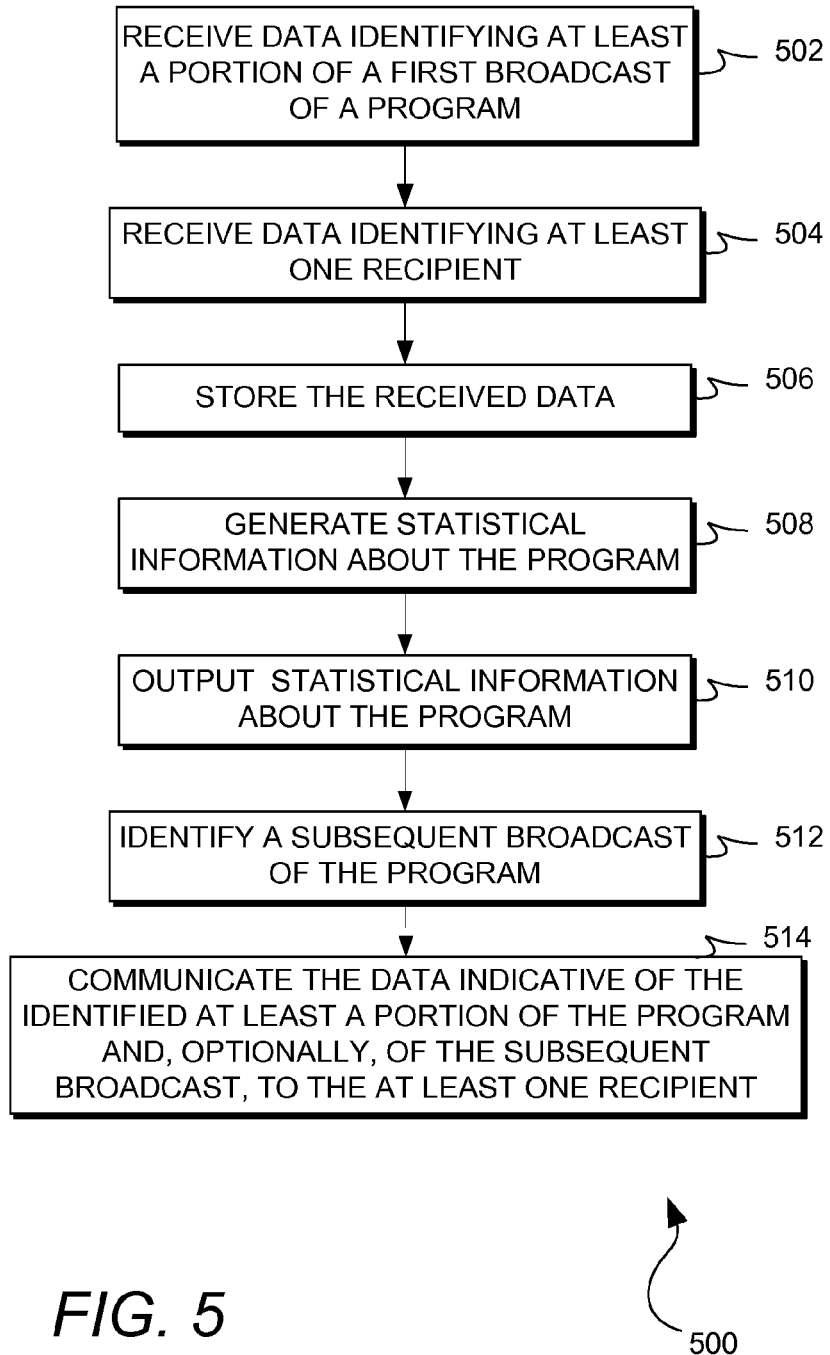
FIG. 5 is a flowchart illustrating another example of a method of sharing information related to broadcast programs such as in the example system illustrated in FIG. 1.

FIG. 5 is a flowchart illustrating another example of a method 500 of sharing information related to broadcast programs such as in the example system 100. Blocks 502 and 504 are similar to blocks 402 and 404, respectively, of the method 400 discussed above. After receiving the data identifying the at least a portion of the first broadcast of the program, and receiving the data identifying the at least one recipient, the method 500 continues at block 506, where the data received at blocks 502 and 504 is stored. The storage device may be associated with the sharing service 128. The stored data can be stored such that the data received at blocks 502 and 504 can be cross referenced. In addition, the stored data may also include data indicative of the user that requested that the identified portion of the broadcast program be shared with the at least one recipient such that it also can be cross referenced. By storing user identifying data in a way such that it is associated with the program identifying data, the sharing service 128 can easily retrieve all programs associated with a particular user, and vice-versa. Using the data stored at the block 506, the sharing service 128 may output data identifying at least one program associated with a user (or output data identifying at least one user associated with a program). The output data may comprise several forms, such as, for example, a web page, an XML document or data formatted for display on mobile device such as the mobile devices 102 shown in FIGS. 1 and 2.

Continuing to a block 508, the sharing service 128 generates statistical information about the program. The statistical information may be generated each time that any user requests sharing a program with at least one recipient. The statistical information may comprise data indicative of the popularity of the individual programs. In one aspect, generating the statistical information indicative of the popularity of the program comprises incrementing a count associated with the program in response to receiving the data identifying the at least a portion of the program at the block 502.

Statistical information generated at the block 508 may also include demographic data associated with the requesting users and/or demographic data associated with the identified recipients. Demographic data may include one or more of items such as, for example, age, gender, race or ethnicity, location of residence, location of the mobile device, socio-economic status, religion, marital status, ownership (home, car, pet, etc.), education, language, etc.

Upon generating the statistical information relating to the program, the requesting users and/or the recipients at the block 508, sharing service 128 outputs the statistical information at a block 510. The outputted information may be provided to a user of a mobile device 102 in the system 100. For example, a list of the most popular programs may be transmitted to one of the mobile device 102 to allow a user to select a program for viewing. A list of the least popular programs may also be provided to the user to allow the user to avoid programs and thereby possibly save time. The data may be output as a web page, an XML document, or in any other suitable form.

The outputted information may also be provided to the content provider 112 or the distribution system 110 (to a marketing department, for example) in order to affect future programming choices. Statistical information regarding demographics may be used to target and/or avoid targeting certain programming to individuals fitting certain demographic profiles.

Proceeding to a block 512, the sharing service 128 identifies a subsequent broadcast of the program based on data from, for example, the program guide service 126. For example, identifying the subsequent broadcast of the program may include outputting an identifier for the subsequent broadcast of the program (e.g., a schedule serial number, a channel number, a title, a time, a date, etc.).

Next, at a block 514, the sharing service 128 communicates the data indicative of the at least a portion of the program to the at least one recipient identified by the data received at the block 504. Optionally, the data indicative of the subsequent broadcast identified at the block 512 is also communicated to the at least one recipient at the block 514. The functions and acts performed at the block 514 may include those function and acts discussed above with reference to the block 406 of the method 400.

In view of the above, one will appreciate that the disclosure addresses how to enable users to mark portions of content in an efficient manner and allowing for the sharing of the marked content without having to send the actual content. For example, the illustrated aspects provide a lower overhead method and apparatus of sharing content data with one or more recipients. For example, power consumption on a mobile device can be reduced by minimizing overhead partially, or all together, for receiving, storing and transmitting content data.

Any illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Those skilled in the art will recognize that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While the above detailed description has shown, described, and pointed out novel features of the invention as applied to various aspects, it will be understood that various omissions, substitutions, and changes in the form and details of the device or process illustrated may be made by those skilled in the art without departing from the scope of this disclosure. As will be recognized, the invention may be embodied within a form that does not provide all of the features and benefits set forth herein, as some features may be used or practiced separately from others. The scope of this disclosure is defined by the appended claims, the foregoing description, or both. All changes which come within the meaning and range of equivalency of the claims are to be embraced within their scope.

What is claimed is:

1. A method of sharing information related to broadcast programs in a wireless communication system, the method comprising:
   identifying, by a wireless device, a portion of a program while receiving a first broadcast of the program;
   receiving recipient information identifying at least one recipient, wherein the at least one recipient is a second user other than a first user associated with the program;
   communicating information indicative of the identified portion of the program to the at least one recipient; and
   outputting a notification to the at least one recipient about a subsequent broadcast of the identified portion of the program at a specified time interval prior to the subsequent broadcast of the identified portion of the program, wherein the identified portion of the program begins at a specified elapsed time from a start of the program, and the notification of the subsequent broadcast of the identified portion of the program is included in the information indicative of the identified portion of the program that is communicated to the at least one recipient.

2. The method of claim 1, wherein communicating information indicative of the identified portion of the program to the at least one recipient further comprises communicating information provided by the first user associated with the program.

3. The method of claim 1, wherein communicating information indicative of the identified portion of the program to the at least one recipient further comprises communicating data for at least part of the identified portion of the program.

4. The method of claim 1, wherein identifying the portion of the program comprises:

rendering the first broadcast of the program; and
receiving an input indicative of the portion of the first broadcast of the program during the rendering of said first broadcast.

5. The method of claim 1, wherein the portion of the program further comprises a temporal location in the program.

6. The method of claim 1, further comprising storing data indicative of the identified portion of the program.

7. The method of claim 1, wherein outputting the notification comprises at least one of generating a sound and displaying data on a display.

8. The method of claim 1, further comprising:
outputting an identifier for the subsequent broadcast of the identified portion of the program.

9. The method of claim 1, further comprising:
identifying the subsequent broadcast of the identified portion of the program based on data defining a program guide.

10. The method of claim 1, further comprising:
generating a popularity statistic indicative of a popularity of the identified portion of the program; and
communicating the generated popularity statistic along with the information indicative of the identified portion of the program.

11. An apparatus for sharing information related to broadcast programs, comprising:
a network interface configured to communicate over a wireless network; and
a processor configured to:
identify a portion of a program while receiving a first broadcast of the program;
identify a subsequent broadcast time of the identified portion of the program;
receiving recipient information identifying at least one recipient, wherein the at least one recipient is a second user other than a first user associated with the program;
communicate information indicative of the identified portion of the program to the at least one recipient over the wireless network; and
output a notification to the at least one recipient about a subsequent broadcast of the identified portion of the program at a specified time interval prior to the subsequent broadcast time of the identified portion of the program, wherein the identified portion of the program begins at a specified elapsed time from a start of the program, and the notification of the subsequent broadcast of the identified portion of the program is included in the information indicative of the identified portion of the program that is communicated to the at least one recipient.

12. The apparatus of claim 11, wherein the processor is further configured to communicate information provided by the first user associated with the program to the at least one recipient over the wireless network.

13. The apparatus of claim 11, wherein the processor is further configured to communicate data for at least part of the identified portion of the program to the at least one recipient over the wireless network.

14. The apparatus of claim 11, wherein the processor is further configured to:
render the first broadcast of the program; and
receive an input indicative of the portion of the first broadcast of the program during the rendering of said first broadcast.

15. The apparatus of claim 11, wherein the portion of the first broadcast of the program further comprises a temporal location in the program.

16. The apparatus of claim 11, further comprising a storage and wherein the processor is further configured to store to the storage data indicative of the identified portion of the program.

17. The apparatus of claim 11, wherein the notification comprises data configured to be output using a loudspeaker to generate a sound.

18. The apparatus of claim 11, wherein the notification comprises data configured to be output by displaying the notification data on a display of a recipient device.

19. The apparatus of claim 11, wherein the processor is further configured to:
generate a popularity statistic indicative of a popularity of the identified portion of the program; and
communicate the generated popularity statistic along with the information indicative of the identified portion of the program.

20. The apparatus of claim 18, wherein the processor is further configured to output an identifier for the subsequent broadcast of the identified portion of the program.

21. The apparatus of claim 18, wherein the processor is further configured to identify the subsequent broadcast of the identified portion of the program based on data defining a program guide.

22. An apparatus, comprising:
means for communicating over a network; and
means for processing configured to:
identify a portion of a program while receiving a first broadcast of the program;
identify a subsequent broadcast time of the identified portion of the program;
receive recipient information identifying at least one recipient, wherein the at least one recipient is a second user other than a first user associated with the program;
communicate information indicative of the identified portion of the program to the at least one recipient over the network; and
output a notification to the at least one recipient about a subsequent broadcast of the identified portion of the program at a specified time interval prior to the identified subsequent broadcast time of the identified portion of the program, wherein the identified portion of the program begins at a specified elapsed time from a start of the program, and the notification of the subsequent broadcast of the identified portion of the program is included in the information indicative of the identified portion of the program that is communicated to the at least one recipient.

23. A non-transitory processor-readable storage medium having stored thereon processor-executable instructions configured to cause a processor to perform operations comprising:
identifying a portion of a program while receiving a first broadcast of the program;
identifying a subsequent broadcast time of the identified portion of the program;
receiving recipient information identifying at least one recipient, wherein the at least one recipient is a second user other than a first user associated with the program;
communicating information indicative of the identified portion of the program to the at least one recipient; and
outputting a notification to the at least one recipient about a subsequent broadcast of the identified portion of the program at a specified time interval prior to the identified subsequent broadcast time of the identified portion of the program, wherein the identified portion of the program begins at a specified elapsed time from a start of the program, and the notification of the subsequent broadcast of the identified portion of the program is included in the information indicative of the identified portion of the program that is communicated to the at least one recipient.

24. A method of sharing information related to broadcast programs, comprising:
    receiving data from a wireless device identifying a portion of a program identified by the wireless device during a first broadcast of the program;
    identifying a subsequent broadcast time of the identified portion of the program;
    receiving data identifying at least one recipient, wherein the at least one recipient is a second user other than a first user associated with the program;
    communicating information indicative of the identified portion of the program to the at least one recipient; and
    outputting a notification to the at least one recipient about a subsequent broadcast of the identified portion of the program at a specified time interval prior to the identified subsequent broadcast time of the identified portion of the program, wherein the identified portion of the program begins at a specified elapsed time from a start of the program, and the notification of the subsequent broadcast of the identified portion of the program is included in the information indicative of the identified portion of the program that is communicated to the at least one recipient.

25. The method of claim 24, wherein the data identifying the portion of the program further comprises information provided by the first user associated with the program.

26. The method of claim 24, further comprising storing the portion of the program.

27. The method of claim 24, further comprising communicating data indicative of the subsequent broadcast of the identified portion of the program to the at least one recipient.

28. The method of claim 24, wherein communicating information indicative of the identified portion of the program to the at least one recipient further comprises communicating data for at least part of the identified portion of the program.

29. The method of claim 24, wherein the data identifying the portion of the program of the first broadcast of the program comprises data indicative of the first user.

30. The method of claim 24, further comprising:
    generating statistical data that comprises a popularity of the program; and
    incrementing a count associated with the program in response to receiving the data identifying the portion of the program of the first broadcast of the program.

31. The method of claim 24, further comprising:
    generating a popularity statistic indicative of a popularity of the identified portion of the program; and
    communicating the generated popularity statistic along with the information indicative of the identified portion of the program.

32. The method of claim 28, wherein communicating data for at least part of the identified portion of the program comprises communicating the identified portion of the program via a unicast stream.

33. The method of claim 29, further comprising storing the data identifying the portion of the program of the first broadcast of the program in association with the data indicative of the first user.

34. The method of claim 33, further comprising outputting data identifying at least one program associated with the first user.

35. The method of claim 33, further comprising outputting data identifying at least one user associated with the program.

36. The method of claim 34, wherein outputting the data comprises generating at least one of a web page, an XML document, or data formatted for display on a mobile device.

37. The method of claim 35, wherein outputting the data comprises generating at least one of a web page, an XML document, or data formatted for display on a mobile device.

38. An apparatus for sharing information related to broadcast programs, comprising:
    a network interface configured to communicate over a wireless network; and
    a processor configured to:
        receive data from a wireless device identifying a portion of a program identified by the wireless device during a first broadcast of the program;
        identify a subsequent broadcast time of the identified portion of the program;
        receive data identifying at least one recipient, wherein the at least one recipient is a second user other than a first user associated with the program;
        communicate information indicative of the identified portion of the program to the at least one recipient over the wireless network; and
        output a notification to the at least one recipient about a subsequent broadcast of the identified portion of the program at a specified time interval prior to the identified subsequent broadcast time of the identified portion of the program, wherein the identified portion of the program begins at a specified elapsed time from a start of the program, and the notification of the subsequent broadcast of the identified portion of the program is included in the information indicative of the identified portion of the program that is communicated to the at least one recipient.

39. The apparatus of claim 38, wherein the data identifying the portion of the program further comprises information provided by the first user associated with the program.

40. The apparatus of claim 38, further comprising a storage configured to store the portion of the program.

41. The apparatus of claim 38, wherein the processor is further configured to identify a subsequent broadcast of the identified portion of the program to the at least one recipient.

42. The apparatus of claim 38, wherein the processor is further configured to communicate data for at least part of the identified portion of the program to the at least one recipient over the wireless network.

43. The apparatus of claim 38, wherein the data identifying the portion of the program of the first broadcast of the program comprises data indicative of the first user.

44. The apparatus of claim 38, wherein the processor is further configured to generate statistical data comprising a popularity of the program by incrementing a count associated with the program in response to receiving the data identifying the portion of the program of the first broadcast of the program.

45. The apparatus of claim 38, wherein the processor is further configured to:
    generate a popularity statistic indicative of a popularity of the identified portion of the program; and
    communicate the generated popularity statistic along with the information indicative of the identified portion of the program.

46. The apparatus of claim 41, wherein the processor is further configured to communicate data indicative of the subsequent broadcast of the identified portion of the program to the at least one recipient over the wireless network.

47. The apparatus of claim 42, wherein the processor is configured to communicate data for at least part of the identified portion of the program via a unicast stream.

48. The apparatus of claim 43, wherein the processor is further configured to store the data identifying the portion of the program of the first broadcast of the program in association with the data indicative of the first user.

49. The apparatus of claim 48, wherein the processor is further configured to output data identifying at least one program associated with the first user.

50. The apparatus of claim 48, wherein the processor is further configured to output data identifying at least one user associated with the program.

51. The apparatus of claim 49, wherein the data identifying the at least one program associated with the first user is output in at least one of a web page, an XML document, or data formatted for display on a mobile device.

52. The apparatus of claim 50, wherein the data identifying at least one user associated with the program is output in at least one of a web page, an XML document, or data formatted for display on a mobile device.

53. An apparatus, comprising:
means for communicating over a network; and
means for processing configured to:
receive data from a wireless device identifying a portion of a program identified by the wireless device during a first broadcast of the program;
identify a subsequent broadcast time of the identified portion of the program;
receive data identifying at least one recipient, wherein the at least one recipient is a second user other than a first user associated with the program;
communicate information indicative of the identified portion of the program to the at least one recipient over the network; and
output a notification to the at least one recipient about a subsequent broadcast of the identified portion of the program at a specified time interval prior to the identified subsequent broadcast time of the identified portion of the program, wherein the identified portion of the program begins at a specified elapsed time from a start of the program, and the notification of the subsequent broadcast of the identified portion of the program is included in the information indicative of the identified portion of the program that is communicated to the at least one recipient.

54. A non-transitory processor-readable storage medium having stored thereon processor-executable instructions configured to cause a processor to perform operations comprising:
receiving data from a wireless device identifying a portion of a program identified by the wireless device during a first broadcast of the program;
identifying a subsequent broadcast time of the identified portion of the program;
receiving data identifying at least one recipient, wherein the at least one recipient is a second user other than a first user associated with the program;
communicating information indicative of the identified portion of the program to the at least one recipient; and
outputting a notification to the at least one recipient about a subsequent broadcast of the identified portion of the program at a specified time interval prior to the identified subsequent broadcast time of the identified portion, wherein the identified portion of the program begins at a specified elapsed time from a start of the program of the program, and the notification of the subsequent broadcast of the identified portion of the program is included in the information indicative of the identified portion of the program that is communicated to the at least one recipient.

55. A method of sharing information related to broadcast programs in a wireless communication system, the method comprising:
identifying a portion of a program by a wireless device while receiving a first broadcast of the program;
identifying a subsequent broadcast of the program including the identified portion of the program that is subsequent to the first broadcast;
receiving recipient information identifying at least one recipient, wherein the at least one recipient is a second user other than a first user associated with the program;
communicating information indicative of the identified portion of the program to the at least one recipient; and
outputting a notification to the at least one recipient about the subsequent broadcast of the program at a specified time interval prior to the identified portion of the program being broadcast in the subsequent broadcast, wherein the identified portion of the program begins at a specified elapsed time from a start of the program, and the notification of the subsequent broadcast of the program is included in the information indicative of the identified portion of the program that is communicated to the at least one recipient.

* * * * *